United States Patent
Hansson et al.

(10) Patent No.: US 6,582,163 B2
(45) Date of Patent: *Jun. 24, 2003

(54) CUTTING INSERT AND HOLDERS THEREFOR

(75) Inventors: Per Hansson, Gävle (SE); Claes Andersson, Valbo (SE)

(73) Assignee: Sandvik Aktiebolag, Sandviken (SE)

( * ) Notice: Subject to any disclaimer, the term of this patent is extended or adjusted under 35 U.S.C. 154(b) by 25 days.

This patent is subject to a terminal disclaimer.

(21) Appl. No.: 09/796,560

(22) Filed: Mar. 2, 2001

(65) Prior Publication Data

US 2001/0019685 A1 Sep. 6, 2001

(30) Foreign Application Priority Data

Mar. 2, 2000 (SE) ................................................ 0000689

(51) Int. Cl.$^7$ ............................. B23B 27/04; B23P 15/28
(52) U.S. Cl. ...................... 407/110; 407/117; 407/113; 407/114; 407/115; 407/116
(58) Field of Search ................................. 407/113, 114, 407/115, 116, 117

(56) References Cited

U.S. PATENT DOCUMENTS

| | | | | |
|---|---|---|---|---|
| 4,778,311 A | * | 10/1988 | Niemi | 407/116 |
| D442,196 S | * | 2/1991 | Pano | D15/139 |
| 4,992,008 A | * | 2/1991 | Pano | 407/114 |
| 5,205,680 A | * | 4/1993 | Lindstedt | 407/116 |
| 5,423,639 A | * | 6/1995 | Wiman | 407/116 |
| 5,586,844 A | | 12/1996 | Nyman | |
| 5,836,723 A | | 11/1998 | Von Haas et al. | |
| D442,195 S | * | 5/2001 | Hansson et al. | D15/139 |
| D443,284 S | * | 6/2001 | Hansson et al. | D15/139 |

FOREIGN PATENT DOCUMENTS

| | | |
|---|---|---|
| DE | 44 36 779 | 4/1998 |
| EP | 0 385 280 | 9/1990 |
| EP | 0 716 895 | 6/1996 |
| GB | 2 012 992 | 12/1979 |

OTHER PUBLICATIONS

Article: XP–002169082, "NOVEX Drehwerkzeuge", Walter AG (Jun. 1992) p. 52.
Article: XP–002169083, "Anwenderkatalog Corokey", Sandvik Coromant (1997) p. 15.

* cited by examiner

Primary Examiner—A. L. Wellington
Assistant Examiner—Dana Ross
(74) Attorney, Agent, or Firm—Burns, Doane, Swecker & Mathis, LLP

(57) ABSTRACT

A tool for chip removing machining includes a holder and a cutting insert removably mounted therein. The insert includes a shaft having opposite ends and defining a first longitudinal center line. A cutting head projects integrally from at least one end of the shaft. The cutting head includes a cutting edge forming an angle of 45° with the first longitudinal center line. Alternatively, or additionally, the cutting head defines a second longitudinal center line forming an angle of 45° with the first longitudinal center line.

11 Claims, 5 Drawing Sheets

Fig. 6
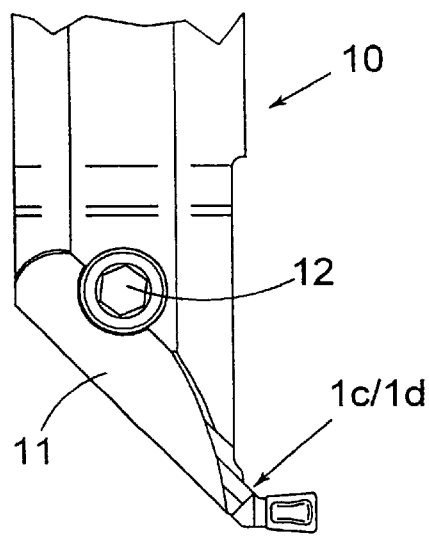
Fig. 7
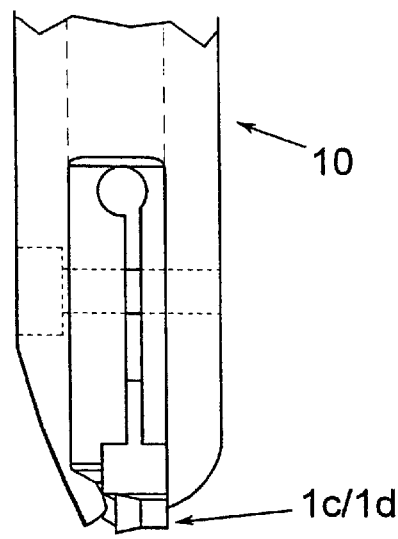
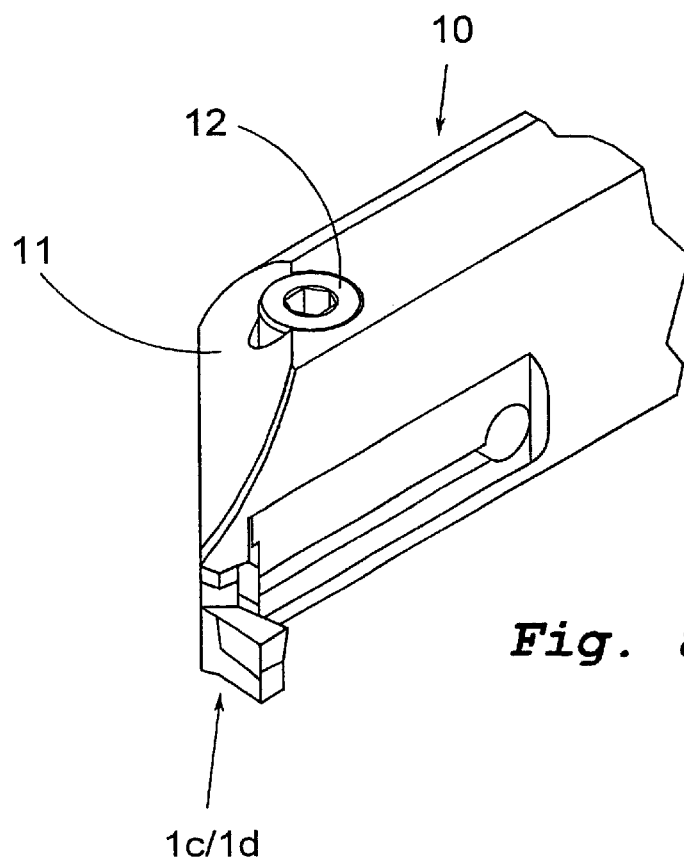
Fig. 8

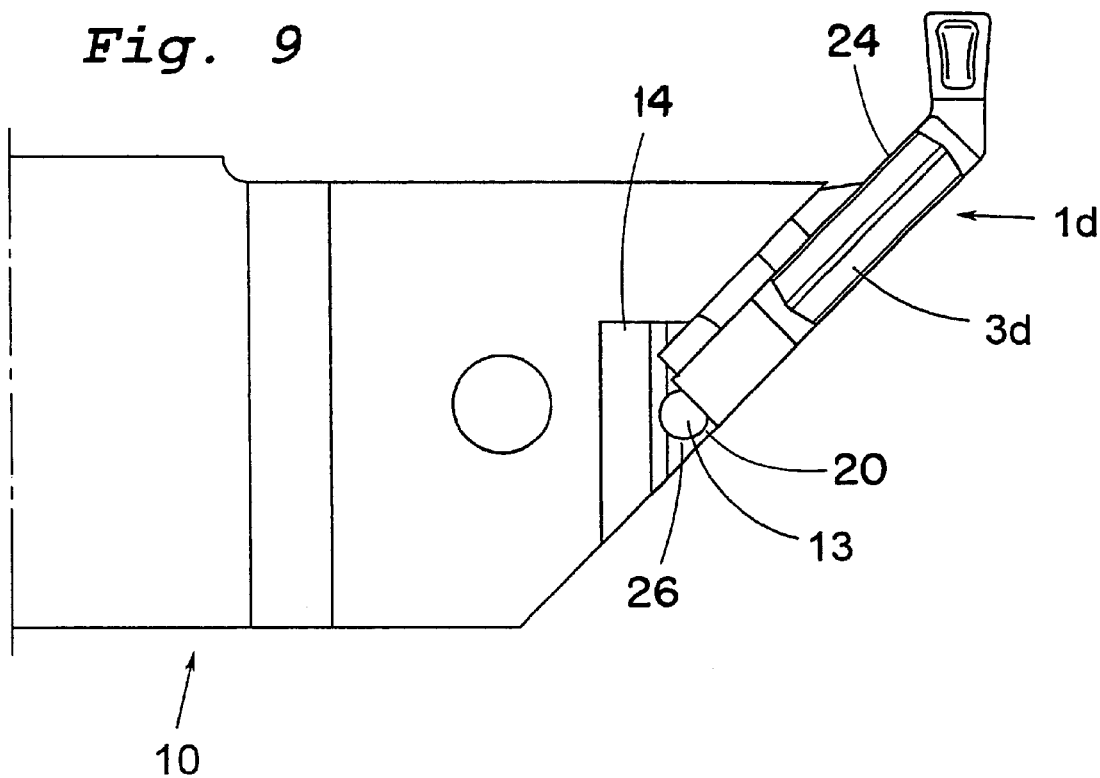
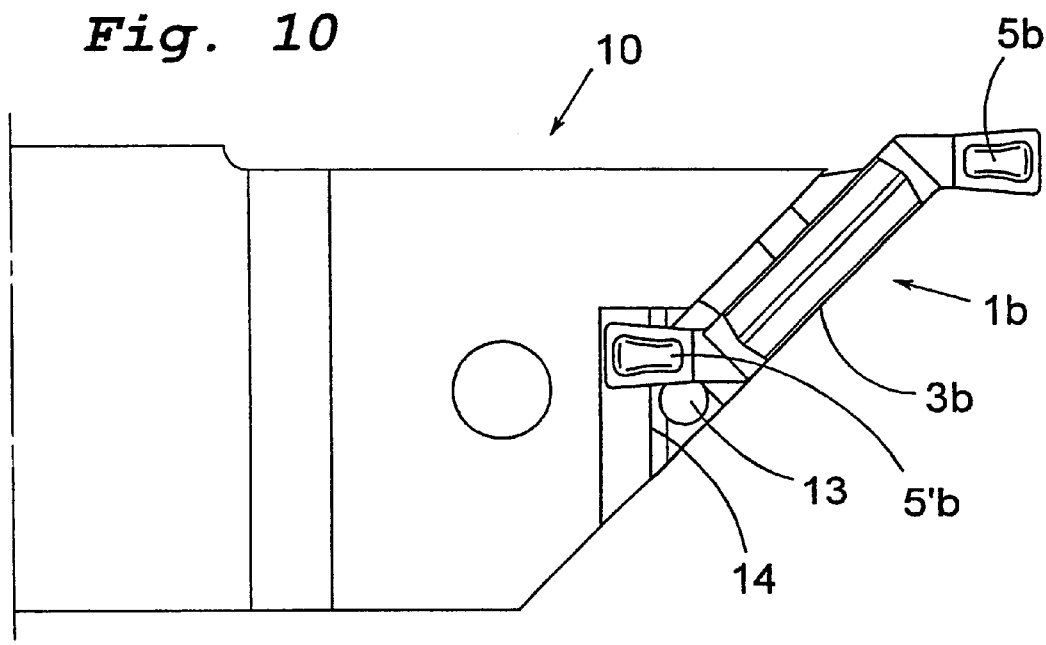

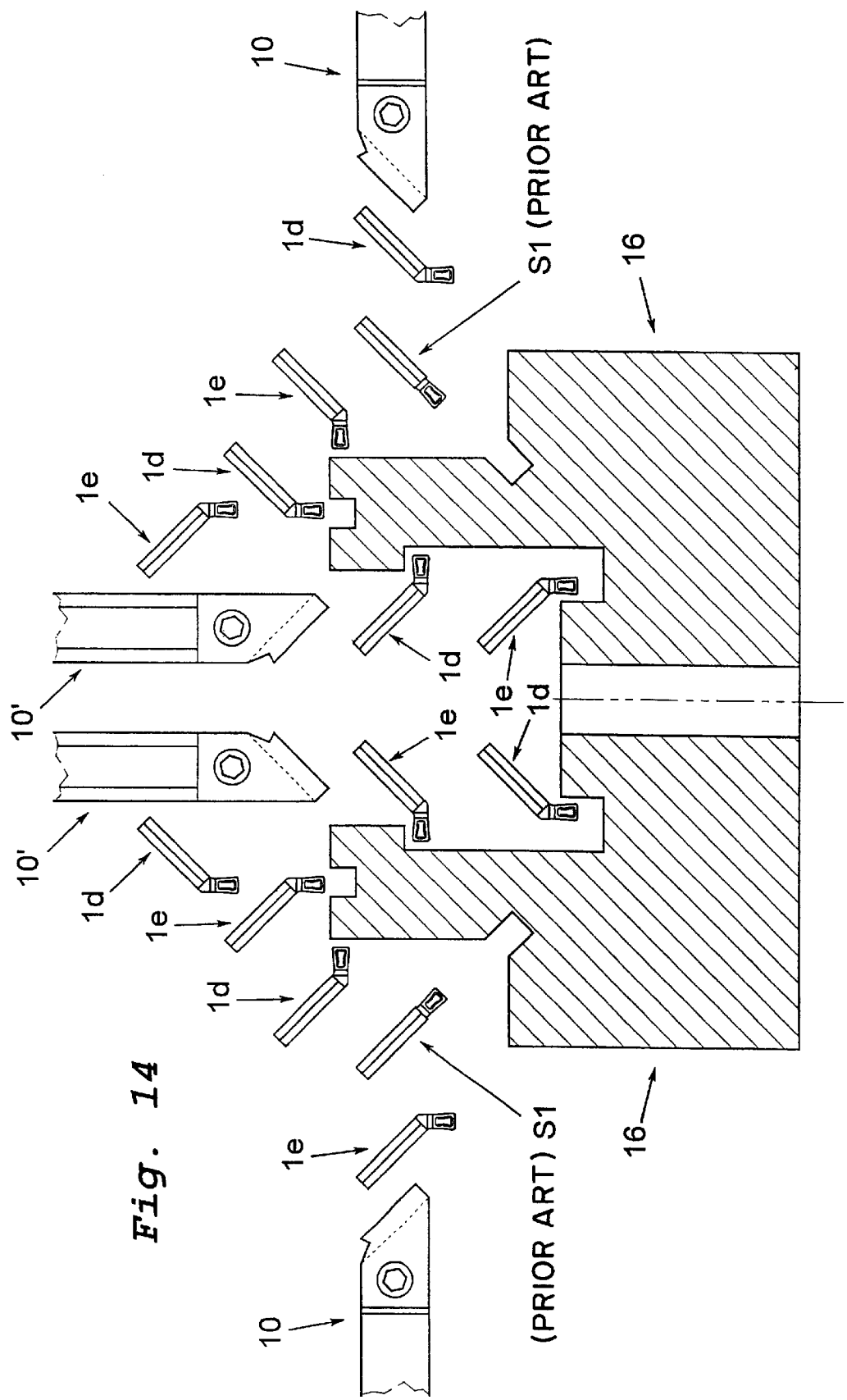

US 6,582,163 B2

CUTTING INSERT AND HOLDERS THEREFOR

RELATED INVENTION

This application claims priority under 35 U.S.C. §§ 119 and/or 365 to Patent Application No. 0000689-0 filed in Sweden on Mar. 2, 2000, the entire content of which is hereby incorporated by reference.

BACKGROUND OF THE INVENTION

The present invention relates to a tool for chip removing machining, whereby the tool comprises a holder as well as a cutting insert fixed in the holder, which cutting insert has at least a first cutting head having a first major cutting edge. The invention also relates separately to the cutting insert included in the tool.

PRIOR ART

A machining tool, which has a cutting insert that, in turn, has a cutting head angled in relation to a mounting shaft, is previously known from WO 95/29781. A characteristic feature of this cutting insert is that the minor cutting edges of the cutting head are not parallel to each other, making it possible for the cutting insert to be fed in two different directions, which are parallel to the respective minor cutting edge. It should also be observed in this context that the major cutting edge is perpendicular to the longitudinal direction of the shaft.

A cutting insert is previously known from EP 0 385 280, which has a cutting head as well as a mounting shaft, whereby the cutting head is hook-shaped with respect to the shaft. According to a preferred embodiment, the cutting head has an extension, which is at a right angle to the axis of the shaft. Also an alternative embodiment shown in the above-mentioned WO 95/29781 has a design which in principal is corresponding to that of EP 0 385 280.

SUMMARY OF THE INVENTION

A primary aim of the present invention is to provide a tool and a cutting insert of the kind defined in the introduction, whereby a small number of different holders and cutting inserts, respectively, make possible a large number of possible combinations as regards cutting operations which may be made with the tool according to the present invention. That is, many different orientations of inserts relative to holders are made possible by a relatively small number of different holders and inserts.

Another aim of the tool and the cutting insert, respectively, according to the present invention is to improve accessibility in different cutting operations in comparison with known tools and known cutting inserts, respectively, having the corresponding outer dimensions.

The present invention relates to a tool for chip removing machining comprising a holder and a cutting insert removably mounting therein. The insert comprises a shaft having opposite ends and defining a first longitudinal center line. A cutting head projects integrally from at least one end of the shaft. The cutting head defines a second longitudinal center line forming an angle of 45° with the first longitudinal center line. Alternatively, or additionally, the cutting head includes a cutting edge forming an angle of 45° with the first longitudinal center line.

The present invention also pertains to the cutting insert per se.

BRIEF DESCRIPTION OF THE DRAWINGS

The objects and advantages of the invention will become apparent from the following detailed description of preferred embodiments thereof in connection with the accompanying drawings, in which like numerals designate like elements, and in which:

FIG. 6 shows a plan view of a part of a tool according to the present invention;

FIG. 7 shows a side view of the tool according to FIG. 6;

FIG. 8 shows a perspective view of the tool according to FIG. 6;

FIG. 9 shows a plan view of the tool according to FIG. 6, whereby the clamp for reasons of clarity has been removed, and a cutting insert according to FIG. 4 is mounted therein;

FIG. 10 shows a plan view of the tool according to FIG. 6, whereby the clamp for reasons of clarity has been removed and a cutting insert according to FIG. 2 is mounted therein;

FIG. 14 shows an assortment of cutting inserts, both according to the present invention and prior art, and holders, whereby different types of machining which respective cutting inserts may carry out are also indicated.

DETAILED DESCRIPTION OF PREFERRED EMBODIMENTS

In FIGS. 1–5, a respective number of cutting inserts 1a, 1b, 1c, 1d, 1e are shown, which constitute cutting inserts according to the present invention. Each one of the cutting inserts 1a-1e comprises a shaft 3a, 3b, 3c, 3d, 3e as well as at least a first cutting head 5a, 5b, 5c, 5d, 5e projecting from an end of the shaft, which cutting head has a first major cutting edge 6a, 6b, 6c, 6d, 6e. What generally distinguishes a cutting insert 1a–1e according to the present invention is that, as seen in a plan view, a longitudinal center line C2 of the cutting head 5a, 5b, 5c, 5d, 5e forms an angle of 45° with the longitudinal center line C1 of the shaft 3a–3e. Furthermore, a line L through the cutting edge 6a–6e of the first cutting head 5a–5e forms an angle of 45° with the longitudinal center line C1 of the shaft 3a–3e.

Figure 1:
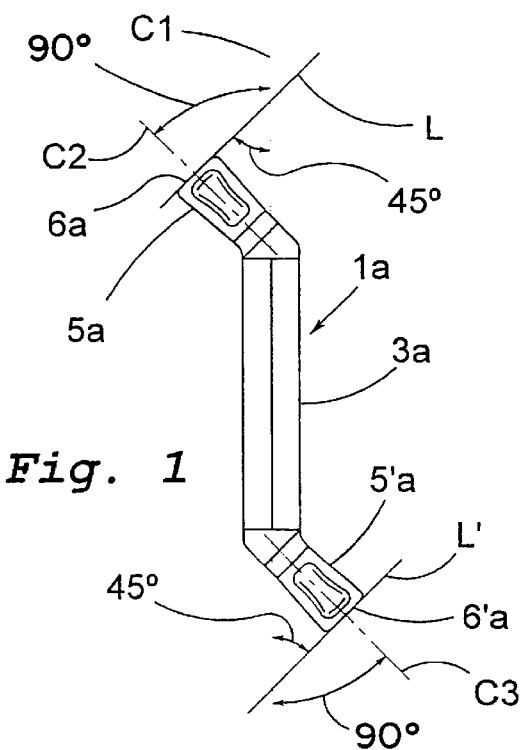
FIG. 1 shows in plan view a first embodiment of a cutting insert according to the present invention.
Figure 2:
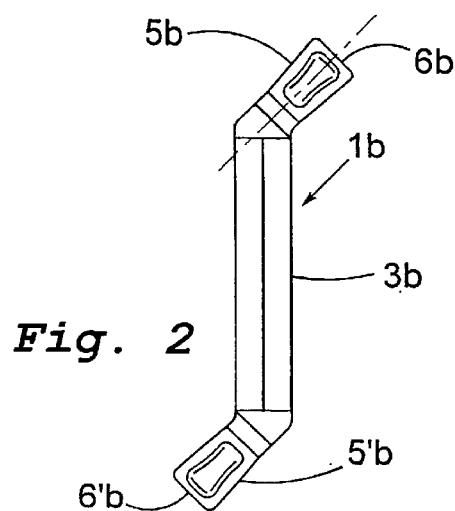
FIG. 2 shows a plan view of a second embodiment of a cutting insert according to the invention.

The cutting inserts 1a, 1b, 1c are provided with a second angled cutting head 5'a, 5'b, 5'c at the opposite end of the shaft 3a, 3b, 3c. These second cutting heads 5'a, 5'b, 5'c also have a major cutting edge 6'a, 6'b, 6'c. The cutting inserts 1a and 1b illustrated in FIGS. 1 and 2 are mirror-inverted in relation to each other, whereby the cutting heads 5a, 5'a; 5b, 5'b on each of the cutting inserts 1a, 1b are angled in opposite parallel directions from the appurtenant shaft 3a, 3b.

Figure 3:
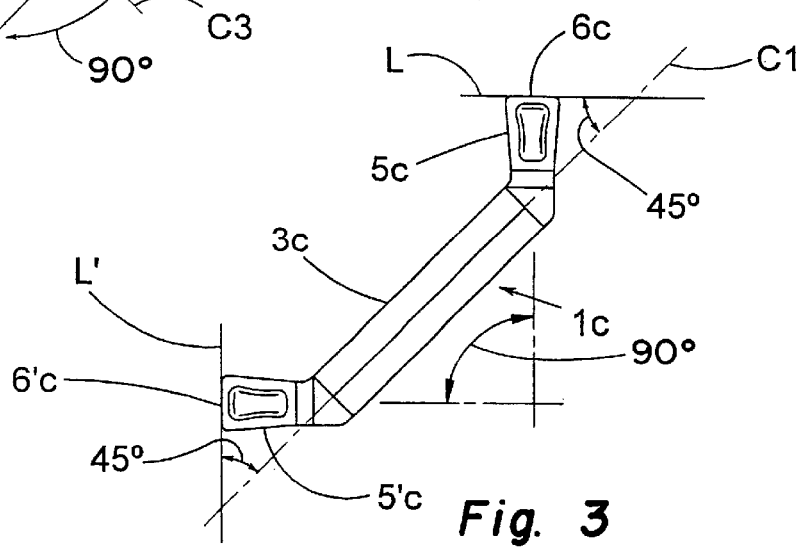
FIG. 3 shows a plan view of a third embodiment of a cutting insert according to the invention.
Figure 4:
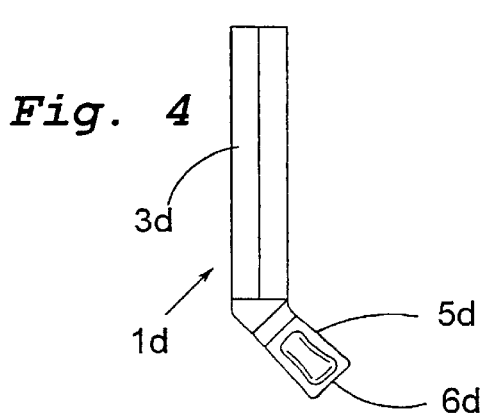
FIG. 4 shows a plan view of a fourth embodiment of a cutting insert according to the invention.
Figure 5:
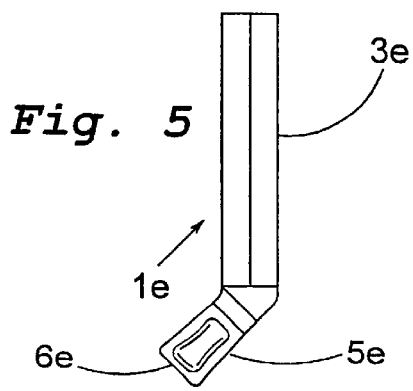
FIG. 5 shows a plan view of a fifth embodiment of a cutting insert according to the invention.

The cutting insert 1c illustrated in FIG. 3 also has two cutting heads 5c and 5'c, whereby said cutting heads 5c, 5'c are angled to the same direction side of the appurtenant shaft 3c. In the corresponding way as for the first cutting heads 5a–5e, a line L' through the second major cutting edges 6'a, 6'b, 6'c forms an angle of 45° with the longitudinal center line C1 of the shaft 3a, 3b, 3c. A longitudinal center line C3 of the cutting head 5'a, 5'b, 5'c forms an angle of 45° with the longitudinal center line C1 of the shaft 3a–3e. Thus, the two cutting heads 5c, 5'c form a 90° angle to one another. In the plan views according to FIGS. 1–5, the major cutting edges 6a, 6'a, 6b, 6'b, 6c, 6'c, 6d, 6e are parallel to the plane of the paper.

The tool according to FIGS. 6–8 comprises a holder 10, in which an insert seat for receiving a cutting insert 1a, 1b, 1c, 1d or 1e according to the present invention is arranged. In particular, the insert 1c or 1d is shown in FIGS. 6–8. A clamp 11 is attached on top of the cutting insert, said clamp 10 being fixed in the holder by means of a screw 12. By tightening the screw 12, the clamp 10 will fix the cutting insert in the appurtenant insert seat in the holder 10.

In FIG. 9, for reasons of clarity, the holder 10 is shown without clamp 11. In that connection, it is seen that the insert seat of the holder 10 has an end stop in the form of a pin 13. As is seen in FIG. 9. the end of the shaft 3d disposed opposite from the cutting head abuts against said pin 13. The design of the end stop as a pin 13 entails the advantage that said end stop also may be used as a stop for cutting inserts which have cutting heads at both ends of the shaft, as will become apparent.

It will be appreciated that the insert seat of the holder includes a seat surface 20 on which the insert is placed. The pin 13 has a cylindrical stop surface 26 against which an end of the insert shaft abuts. The surface 26 defines a center axis extending perpendicular to the seat surface 20.

Figure 11:
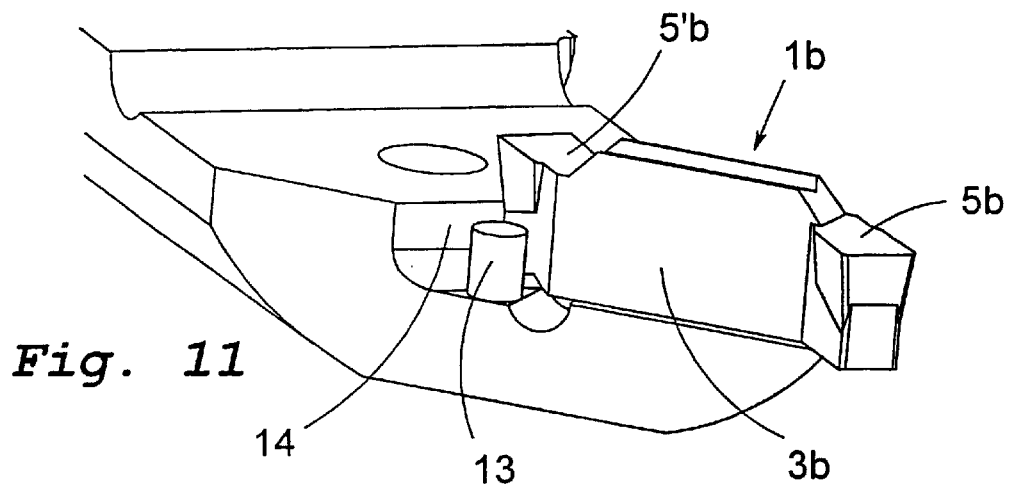
FIG. 11 shows a perspective view of the tool according to FIG. 10.

In FIGS. 10 and 11, where the clamp, for reasons of clarity, is omitted, it is shown how a cutting insert 1b having cutting heads 5b and 5'b at both ends of the shaft 3b may be attached in the holder 10. As is most clearly seen in FIG. 10, the insert seat in the holder 10 is formed with a recess 14 extending alongside the pin 13 in a direction transversely of the center axis of the insert shaft for receiving the non-active cutting head 5'b, i.e., the cutting head which is not in an active position. Also in this case, the pin 13 acts as an end stop for the cutting insert 1b, in that the pin 13 cooperates with one of the side surfaces of the non-active cutting head 5'b of the cutting insert 1b. Thanks to the shaft 3b being fixed laterally in the insert seat of the holder 10, abutment of said side surface against the pin 13 will ensure that the cutting insert 1b is secured against displacement in the longitudinal direction of the shaft 3b towards the non-active cutting head 5'b. That is, cooperation between the side surface of the non-active cutting head 5'b and K the pin 13 constitutes an end stop for the cutting insert 1b. Said end stop works in the corresponding way also when the insert 1b is reversed such that the cutting heads 5b and 5'b change places with each other.

Figure 12:
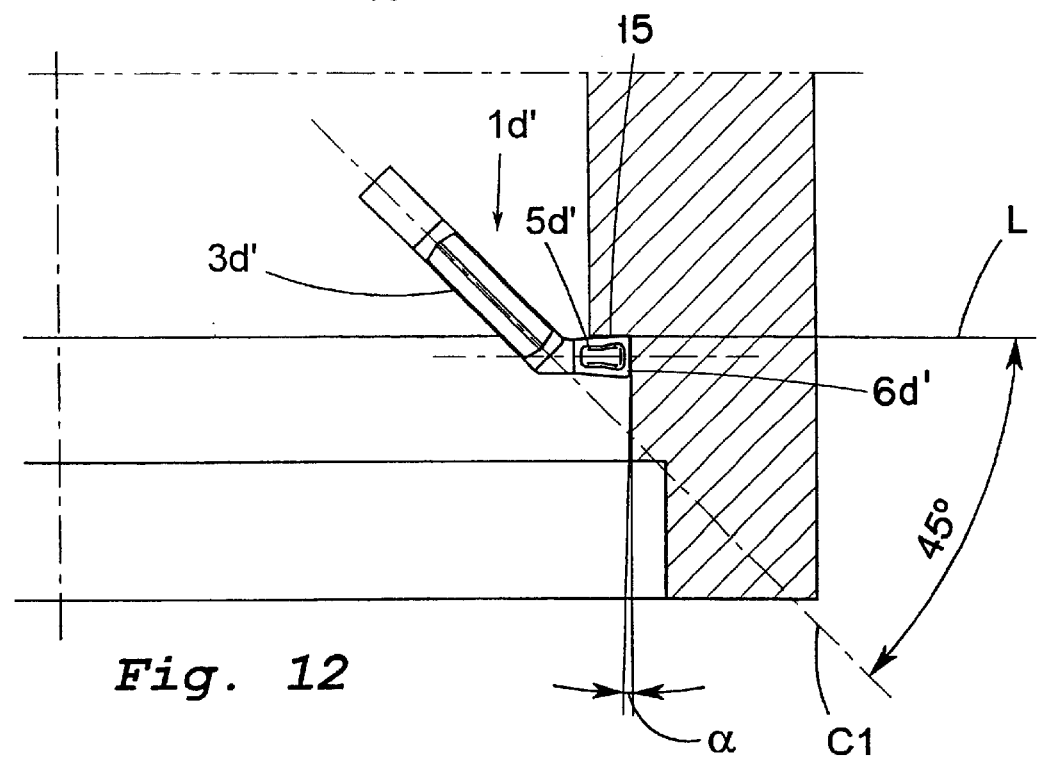
FIG. 12 shows a feasible type of machining performed by a cutting insert according to the present invention.

The use of a cutting insert 1d' according to the present invention for internal turning is shown in FIG. 12. Said cutting insert 1d' constitutes a variant of the cutting insert 1d according to FIG. 4, whereby one of the side edges of the cutting head 5d' of the cutting insert 1d' constitutes a major cutting edge 15, which carries out machining of the work piece. The edge 6d' corresponding to the major cutting edge 6d of the cutting insert 1d defines, in that connection, the clearance angle α marked in FIG. 12. As is seen in FIG. 12, also in this embodiment, a line L through the major cutting edge 15 forms an angle of 45° with the longitudinal center line C1 of the shaft 3d'.

Figure 13:
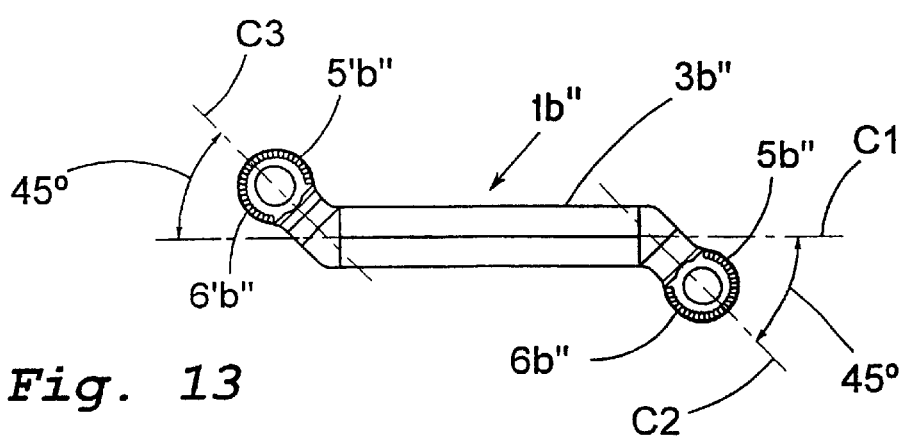
FIG. 13 shows a plan view of an additional cutting insert according to the present invention.

The cutting insert 1b" according to the present invention illustrated in FIG. 13 differs principally from the cutting insert 1b according to FIG. 2 in that as seen in plan view the cutting heads 5b" and 5'b" have continuously curved cutting edges 6b", 6'b", more precisely a cutting edge which has a circular shape as seen in plan view. As for the angling of the cutting heads 5b", 5'b" in relation to the shaft 3b", each of the longitudinal center lines C2 and C3 of the respective cutting heads 5b" and 5'b" form an angle of 45° with the longitudinal center line C1 of the shaft 3b".

In FIG. 14, a number of cutting inserts and a number of holders are shown, whereby the cutting inserts 1a–1e constitute cutting inserts according to the present invention while the cutting inserts S1 represent prior art inserts. The holders 10 and 10' have different rear shapes (not shown), whereby the holder 10 is intended for external tools while the holder 10', which for instance consists of a bar, is intended for internal tools. The cutting inserts may arbitrarily be combined with any one of the holders 10, 10'.

In FIG. 14, a workpiece 16 is also shown, in which different types of machining operations are marked, the majority of which advantageously may be made by means of a tool according to the present invention.

Feasible Modifications of the Invention

The detailed design of the cutting insert according to the present invention may naturally be varied within the scope of the invention. As is seen in the embodiments accounted for above, the cutting heads may thus have different designs as regards the position of the major cutting edges but also as regards surfaces for chip breaking and clearance. Also the design of the shaft may be varied, for instance depending on the design of the insert seat and the clamping members of the holder.

What is claimed is:

1. A cutting insert for chip removal machining, comprising a shaft having opposite ends and defining a first longitudinal center line, a cutting head projecting integrally from one end of the shaft, the cutting head defining a second longitudinal center line forming an angle of 45° with the first longitudinal center line, the cutting head configured symmetrically with respect to the second center line.

2. The cutting insert according to claim 1 wherein the cutting head includes a cutting edge forming an angle of 45° with the first longitudinal center line.

3. The cutting insert according to claim 2 wherein the cutting edge forms an angle of 90° with the second longitudinal center line.

4. The cutting insert according to claim 1 wherein there are cutting heads projecting integrally from both ends of the shaft.

5. The cutting insert according to claim 4 wherein the cutting heads extend parallel to one another.

6. The cutting insert according to claim 4 wherein the two cutting heads form a 90° angle between one another.

7. The cutting insert according to claim 1 wherein the cutting head includes a curved cutting edge.

8. The cutting insert according to claim 7 wherein the cutting edge is substantially round.

9. The cutting insert according to claim 1 wherein the cutting edge forms an angle of 90° with the second longitudinal center line.

10. A cutting insert for chip removal machining, comprising a shaft having opposite ends and defining a first longitudinal center line, a cutting head projecting integrally from one end of the shaft, the cutting head defining a second longitudinal center line forming an angle of 45° with the first longitudinal center line, wherein there are two cutting heads projecting integrally from both respective ends of the shaft, the two cutting heads forming a 90° angle between one another.

11. A cutting insert for chip removal machining, comprising a shaft having opposite ends and defining a first longitudinal center line, a cutting head projecting integrally from one end of the shaft, the cutting head including a cutting edge forming an angle of 45° with the first longitudinal centerline, wherein there are two cutting heads projecting integrally from both respective ends of the shaft, the two cutting heads forming a 90° angle between one another.

* * * * *